US008065542B2

United States Patent
Struik

(10) Patent No.: US 8,065,542 B2
(45) Date of Patent: Nov. 22, 2011

(54) DISTRIBUTED TABLE-DRIVEN POWER MODE COMPUTATION FOR CONTROLLING OPTIMAL CLOCK AND VOLTAGE SWITCHING

(75) Inventor: Pieter Struik, Nuenen (NL)

(73) Assignee: Synopsys, Inc., Mountain View, CA (US)

( * ) Notice: Subject to any disclaimer, the term of this patent is extended or adjusted under 35 U.S.C. 154(b) by 437 days.

(21) Appl. No.: 12/347,008

(22) Filed: Dec. 31, 2008

(65) Prior Publication Data

US 2010/0169680 A1    Jul. 1, 2010

(51) Int. Cl.
*G06F 1/00* (2006.01)
*G06F 1/26* (2006.01)
*H02J 1/10* (2006.01)
*H02J 3/14* (2006.01)
*G01R 21/00* (2006.01)
*G01R 19/00* (2006.01)

(52) U.S. Cl. .......... 713/322; 713/320; 713/324; 307/29; 307/31; 702/60; 702/64

(58) Field of Classification Search .................. 713/320, 713/322, 324; 307/29, 31; 702/60, 64
See application file for complete search history.

(56) References Cited

U.S. PATENT DOCUMENTS

| 6,988,211 | B2 * | 1/2006 | Cline et al. ..................... 713/300 |
| 7,178,044 | B2 * | 2/2007 | Pappalardo et al. .......... 713/300 |
| 7,206,949 | B2 * | 4/2007 | Kuranuki ...................... 713/320 |
| 7,421,601 | B2 * | 9/2008 | Bose et al. .................... 713/320 |
| 7,500,204 | B2 * | 3/2009 | Pineda De Gyvez et al. 716/133 |
| 2008/0109656 | A1 | 5/2008 | Kotzin |

FOREIGN PATENT DOCUMENTS

WO    WO 2008/012483 A1    1/2008

OTHER PUBLICATIONS

ISA/EP, International Search Report dated Mar. 18, 2010 for International App. No. PCT/US2009/069829.

* cited by examiner

*Primary Examiner* — Stefan Stoynov
(74) *Attorney, Agent, or Firm* — Jones Day

(57) ABSTRACT

A method for computing the optimal power mode for a system-on-chip (SoC) in which both the clock and Vdd settings are controlled. Information from hardware blocks is synthesized into a global power mode for the entire SoC. The clocks can be disabled or enabled, and Vdd voltages can be disabled, set at a nominal operating level, and set at a retention level in which the state of memory and registers is retained.

17 Claims, 4 Drawing Sheets

INTERNALS OF THE PMFW (1)

COMPUTING VALID MODE TRANSITIONS

BASIC ALGORITHM
- A LOAD CAN BE IN A NUMBER OF STATES
- A VALID MODE FOR A COLLECTION OF LOADS IS OBTAINED BY COMBINING STATES SUCH THAT THERE ARE NO CONFLICTS FOR PM RESOURCES (E.G. A CLOCK CANNOT BE DISABLED IF THERE IS A HW IP THAT REQUIRES A CLOCK)
- IF THERE ARE MULTIPLE VALID MODES ON SYSTEM LEVEL, ONE IS SELECTED
- THE SELECTED MODE DETERMINES WHAT PM RESOURCE SETTINGS MUST BE CHANGED

DETAILS: LOAD STATE
- ACTIVE → CLOCK ENABLED; VDD ENABLED; SWITCH ENABLED
- STANDBY → CLOCK DISABLED; VDD ENABLED; SWITCH ENABLED
- RETENTION → CLOCK DISABLED; VDD AT RETENTION LEVEL; SWITCH ENABLED
- PowerDown → Vdd DISABLED or SWITCH DISABLED (CLOCK: DON'T CARE)

- AN ACTIVATED LOAD MUST BE IN THE ACTIVE STATE
- A DE-ACTIVATED LOAD CAN BE IN ANY STATE (INCL. ACTIVE!)

FIG. 1A

DISTRIBUTED TABLE-DRIVEN POWER MODE COMPUTATION FOR CONTROLLING OPTIMAL CLOCK AND VOLTAGE SWITCHING

BACKGROUND

1. Field

The present invention relates to methods for computing and controlling power modes for a System on Chip (SoC). More particularly, the present invention relates to global power management of an SoC.

2. Description of Related Art

Global power management is becoming an increasingly important issue as energy costs continue to increase. In addition, by reducing power consumption and extending battery life in applications that may include mobile applications and portable media players, power control management provides the ability to increase functionality without having to increase power capacity and size of the devices. Global power management semiconductor is a market that is expected to undergo significant growth in the near-future.

There have been recent attempts at controlling power modes of semiconductors. For example, in the Open Multimedia Application Platform (OMAP), a Texas Instruments microprocessor, and more particularly, OMAP3, one of the mechanisms used that is available in Linux, called "CPUidle" The "CPUidle" is initialized with a table of possible global power modes, and includes properties on which the CPUidle can decide when to switch from one power mode to another power mode. The CPUidle framework includes a governor, which decides the target state C of the system; a CPUidle driver populates the C states supported by the system and implements functions to transition to the C states; and generic CPUidle framework, wherein every time the idle loop is called, this framework calls the current governor to decide the target state C of the system. This framework also calls the current driver to transition to the C state selected by the governor.

In addition, it is known that every driver implements suspend/resume after registration with the Linux Driver Model (LDM). The drivers release clocks and then save the context in a suspend call and restore these when "resume" is called. Also, drivers which have already released their clocks and have saved their context need not do anything in their suspend call.

However, one problem with a global (top-down) power management controller is that the controller has to query a lot of data regarding the current state of the SoC in order to decide which power mode is most appropriate. For example, when querying such information, virtually all details regarding the SoC are needed (e.g. an address map of all peripherals, etc.).

If both clocks and Vdd are managed, simple reference counting cannot be applied. For example, when the reference count of a Vdd reaches zero after a last decrement, the Vdd cannot necessarily be disabled. As Vdd=0, this means that all state (registers) of a hardware block will be lost. Hence, before disabling a Vdd, a state saving is required. Such a saving takes time, and the decision as whether or not to disable a Vdd-when the reference count reaches 0, must take into account how long the expected idle time (is w.r.t. the time that saving takes).

In general, disabling a clock is typically a good idea as it takes only a few cycles. However, disabling a Vdd needs a more elaborate trade-off, and the cost in cycles it takes to make the transition. Moreover, if the SoC has embedded Vdd switches, the trade-off is even more complicated. For example, There is a case where two hardware blocks (A and B) both have the same Vdd supply, but A also has a Vdd switch. As a result, A can be powered down by opening the switch or by Vdd going to zero (or both).

SUMMARY

Accordingly, the present invention provides a distributed table-driven mode computation for clock and voltage switching. Clocks, Vdd-s, and embedded Vdd switches are managed with regard to power states so that the aforementioned can be disabled, or powered off.

DETAILED DESCRIPTION

In an exemplary aspect of the invention, the System on Chip is divided into hardware blocks that have at most, 1 clock, 1 Vdd and 1 embedded switch. When a load is active, there can only be one active power state. When a load is idle, it can be in any power state.

TABLE 1 table for CPU

| C | V | S |
|---|---|---|
| enabled | enabled | enabled |
| disabled | enabled | enabled |
| disabled | retention | enabled |
| don't care | disabled | enabled |
| don't care | don't care | disabled |

Table 1 is an exemplary transition table according to the present invention, in which a row denotes the power state and columns denote the power management resources (in this example, clocks, Vdd's and switches). In this transition table, the first row corresponds to the Active power state, the second row the standby state, the third row the retention state, the fourth and five rows correspond to the PowerDown state.

Still referring to Table 1, each row in the transition table has a number of properties:

(a) Benefit Value—indicating how "beneficial" is a transition to the power state/mode represented by that row. Beneficial is not an absolute value, such as, for example, an amount of mWatts saved, but is rather a relative term. The row with the largest benefit should typically be chosen.

(b) PowerDown Latency—the number of computing cycles required to perform a state save operation before actually transitioning to the power mode represented by the row.

(c) Wakeup Latency—the number of computing cycles it takes to perform a state restore operation before resuming computation.

When joining a row from one table with a row from another table, the property values of the join is the sum of the individual properties.

Figure 1B:
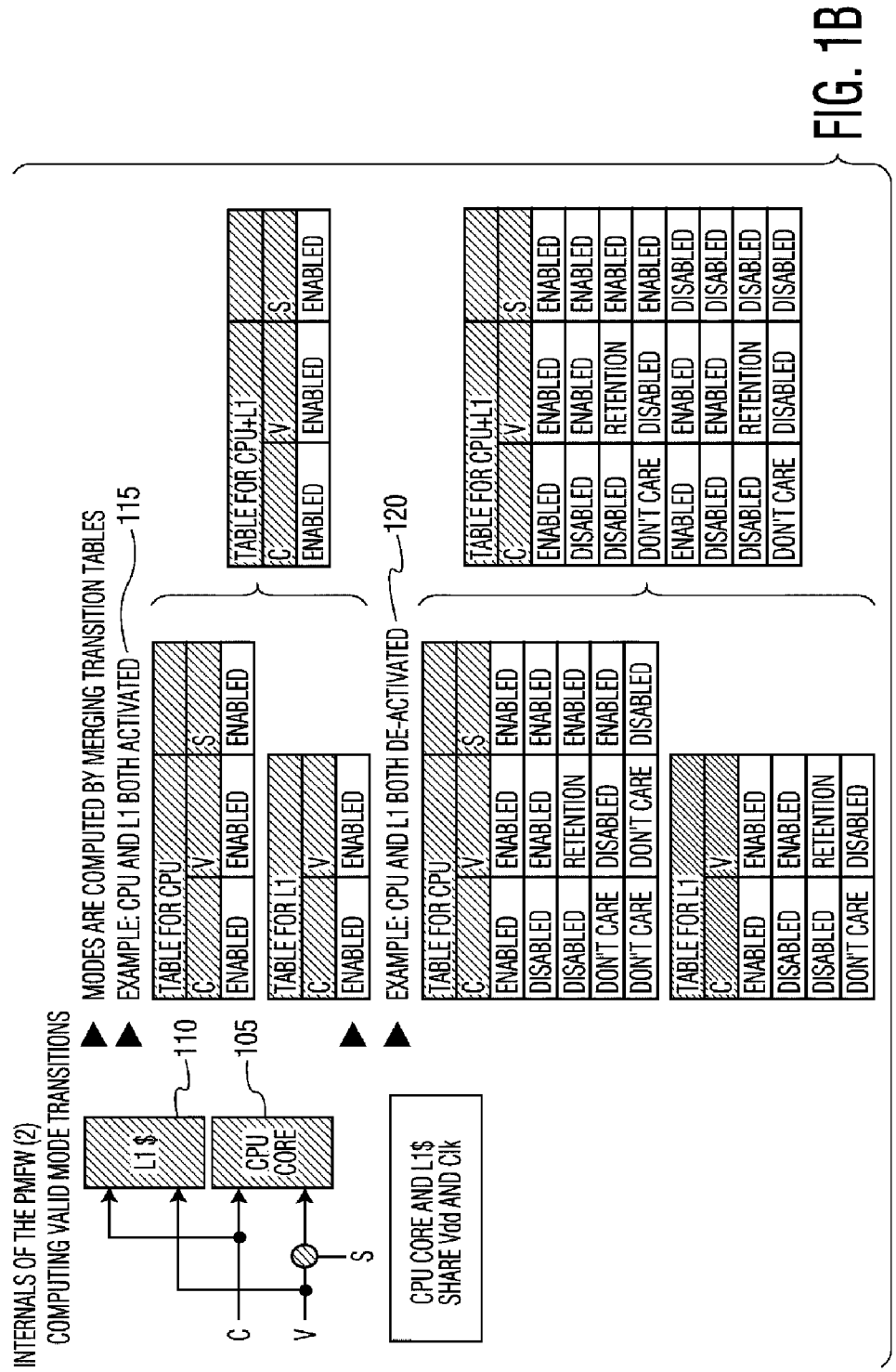
FIG. 1 is description of a basic algorithm according to the present invention.

FIGS. 1A and 1B illustrate valid computing mode transitions according to a basic algorithm of the present invention. A load can be in a number of different states. A valid mode for collection of loads is obtained by combining states such that there are no conflicts for Power Management resources. For example, a clock cannot be disabled if there is a hardware IP that requires that same clock. If there are multiple valid modes on a system level, one mode is selected. FIG. 1B shows a CPU 105 and load L1 110 both activated 115 and deactivated 120.

Figure 2:
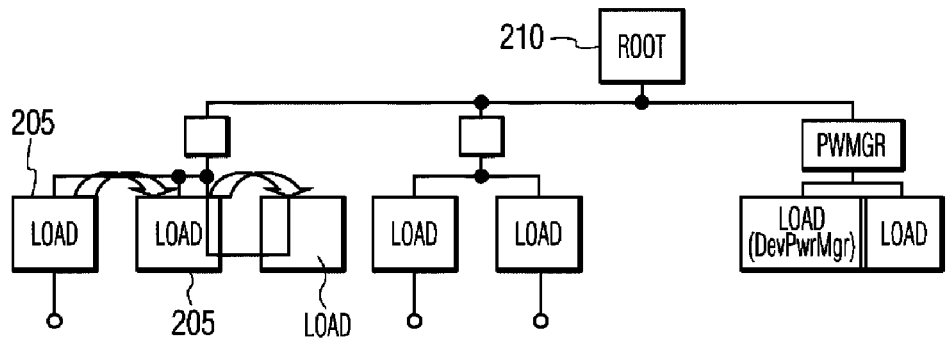
FIG. 2 is an illustration is an illustration of the loads in a tree-like hierarchy according to the present invention

As shown in FIG. 2, power loads 205 are organized in a tree-like hierarchy, whereby the leaves are power loads and the trees represent the subsystems that consist of a collection of loads. The root 210 of the tree represents the entire SoC. Internally in the PMFW, loads are the leaves of a tree-like hierarchy. The mode transition table for an intermediate node is computed by merging the transition tables of its children. The composition of the hierarchy has impact on the complexity of the computation of the transition table. For example: two loads that have no PM resources in common and do not depend on each other have independent transition tables. The number of modes in the merged transition table is the product of the sizes of the load's tables.

Moreover, once the transition table for the root (representing the entire SoC) has been computed, a row must be selected (referred to as "policy"). Selection depends on the row properties that are computed in along with the table join process. Usually, there is a notion of how long the system will be idle. According to the present invention, a row is selected with a maximum benefit and affordable latency (e.g. the sum of the powerdown latency and wakeup latency does not exceed 10% of the expected idle time period). When a row has been selected, the actual mode transition can be executed (outside the scope of this invention).

Figure 3:
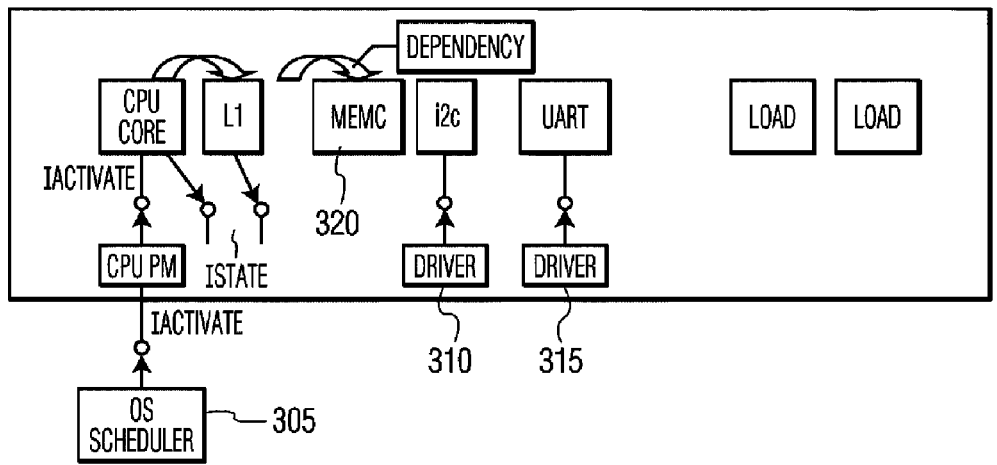
FIG. 3 is an illustration of the System on Chip and the control of loads according to the present invention.

As shown in FIG. 3, some loads are controlled directly by an OS scheduler 305, or by device drivers 310, 315. In addition, there are loads indirectly controlled, such as "memc" 320, which is useful for HW P with no SW counterpart. An advantage is the prevention of drivers from managing many PM resources that are not directly related to the driver's HW IP. Moreover, loads that are neither controlled directly nor controlled indirectly will always remain active (i.e. the clock cannot be disabled). In addition, the IActivation has two functions, one to Activate when the HW IP is fully operational; and "Deactivate" which will try to disable Power Management Resources, the period of idle time may be used by the PMFW to make a decision on enabling/disabling of PM resources. PMFW supports state save/restore Call out to IState interface. PMFW safeguards correct sequencing of calls. Advice: introduce a separate component that implements save/store forwards Activate ( ) and DeActivate ( ) calls short idle period: do not forward call to the PMFW.

Figure 4:
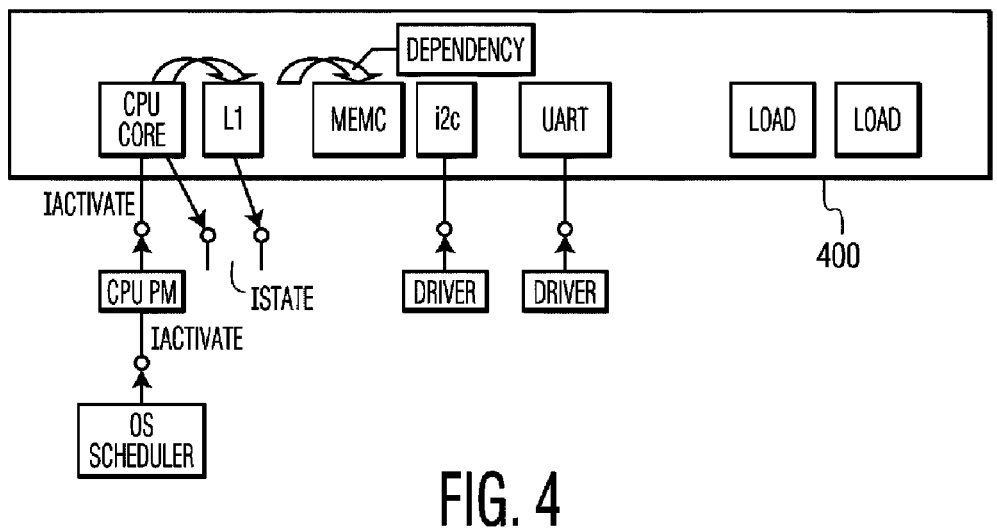
FIG. 4 is another illustration of the System on Chip and power management according to the present invention.

FIG. 4 illustrates the PMFW of an SoC 400 according to the present invention supporting state save/restore functions. This includes a call out to the IState interface, and PMFW safeguards in the correct sequencing of calls. It is also within the spirit and scope of the present invention to provide a separate component that (1) implements save/store; (2) forwards Activate ( ) and DeActivate ( ) calls. Also, it is within the spirit and scope of the present invention that during a short idle period, there are no calls forwarded to the PMFW.

In an example of one basic operation according to the present invention, during initialization, the power loads are organized (as the leaves) in a tree structure. For each power load the following information is stored: (1) clock id (a number); (2) vdd id; (3) optionally, an embedded switch id; (3) three benefit values for the Standby State, Retention state, and Power Down state, respectively; (4) PowerDown Latency; and (5) Wakeup latency. Based on the above-identified information, the load's transition table is initialized. Initially, the load is active (not idle). The transition table only contains a row for the Active state.

A software interface (API) signals that a load can be idle, (the Deactivate function) and to signal that a load must be active (the Activate function).

Power Mode Transitions

Any change to the power mode is done by calling either the Activate Function or the Deactivate Function for a specific load. For example, when the operating system that runs on a cpu cannot schedule a thread it will call the DeActivate function of the cpu load. When the DeActivate function is called, the load will have a full transition table, including rows for power states: Active, Standby, Retention, and PowerDown. When the Activate function is called, the transition table will only contain a row for the Active power state. In both cases, the next action is to trigger the root of the hierarchy to compute the mode transition table for the entire SoC. The basic operation for computing a transition table (of a node in a tree) is joining the transition tables of its children.

According to the present invention, a Power Management Framework (PMFW) is used to control the Power Management Resources. Thus, the power management framework computes valid power mode transitions and selects the one that has the "deepest" sleep mode (to be discussed hereinafter). As a result, some clocks are either disabled or enabled, some Vdd settings are changed, and some embedded Vdd switches are opened or closed. A SoC specific driver translates these change settings in driver calls to the PM hardware (clock generator unit (CGU), PMC, CMC, etc).

Figure 5:
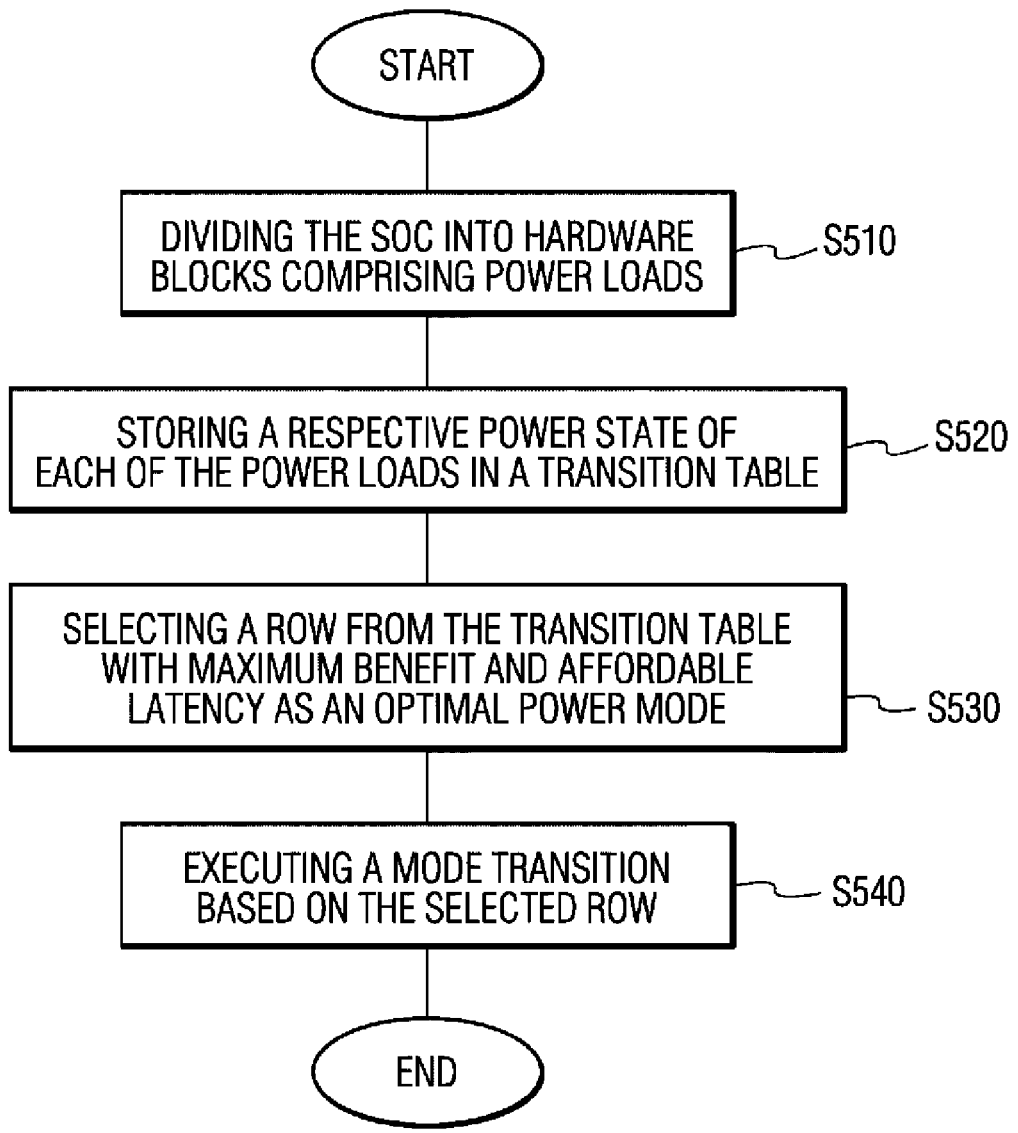
FIG. 5 is a flowchart illustrating exemplary method steps according to the present invention.

FIG. 5 is a flowchart illustrating exemplary steps of a method to compute the optimal power mode according to the present invention. At step 510, the System-on-Chip SoC id divided into a plurality of hardware blocks comprising power loads. Each of the power loads includes no more than one clock, one Vdd, and one embedded switch. Such power loads may comprise a CPU core, level 1 cache memory, memory controller, and other types of peripherals.

At step 520, a respective power state of each of the power loads is stored in a transition table. This transition table may look like, for example, TABLE 1, or as in FIG. 1B. The power loads may be active or idle, and such status is associated with use, meaning that, for example, unused loads are typically idle. An active load can only be in the active power state. On the other hand, idle loads can be in any of a number if states, such as standby, retention, or powerdown. The transition table can be formed by, for example, computing to join/merge the tables of its sub-trees, with sub-trees representing subsystems that may comprise a number of loads.

At step 530, a row is selected from the transition table for use as an optimal power mode, with the row having a maximum benefit and affordable latency. The latency is defined as the number of compute cycles to perform an operation. Powerdown latency and Wakeup latency are two such types of latencies. According to the present invention, selecting a row in which a sum of the powerdown latency and wakeup latency does not exceed 10% of the expected idle time period is considered to be preferable.

Finally, step s540, which is essentially optional, as the invention comprises a method for selection, a mode transition can then be executed based on the selected row.

Finally, a table join function, wherein for example, there is a joining/combining of a table X and table Y. Each combination of rows from tables X and Y are combined in a table join function, such as row x of table X and row y of table Y. Only if the combination of x and y is a valid result, is a new row created in the table join of X and Y. Some variations of the table join function include:

---

(1) Joining clocks that are not common (i.e. part of row x and not part of row y, and vice versa)
   Simply copy the clock (value) into the joined row
(2) Joining clocks that are both in row x and row y
   If clock[x] is 'don't care' → copy clock[y] into joined row
   Else if clock[y] is 'don't care' → copy clock[x]
   Else if clock[x] equals clock[y] → copy clock[x]
   Otherwise, the join of row x and row y is invalid
(3) Joining Vdd-s that are not common
   Simply copy the Vdd (value) into the joined row
(4) Joining Vdd-s that are both in row x and row y
   If vdd[x] is 'don't care' → copy vdd[y] into joined row
   Else if vdd[y] is 'don't care' → copy vdd[x]
   Else if vdd[x] equals vdd[y] → copy vdd[x]
   Otherwise, the join of row x and row y is invalid
   [if there is an embedded Vdd switch associated with the Vdd, the vdd[ ] value is also "don't care" when the switch is open (disabled)]
(5) Properties (benefit, powerdown latency, and wakeup latency)
   Take the sum of the individual properties of row x and row y.

---

Optimization 1: Dependencies

Often power loads depend on each other in the sense that whenever load A is active, load B must be active too, and vice versa. Typical example, when a cpu core is not idle, the cpu's cache memory must be clocked and powered too At initialization time, for each load it is denoted on which other loads it (directly) depends. In this way, an (acylic) dependency graph of loads is defined.

An Activate( ) or DeActive( ) call to a load is now propagated through the dependency graph. As a result multiple transition tables (on the load level) may change.

Defining dependencies is thus a good way to manage hardware loads that do not have a software driver (dependencies also determine the order in which loads must do state saving and restoring).

Optimization 2: Replace a Stubtree in the Hierarchy by an Optimized Implementation A subtree (in the tree hierarchy) spans a number of loads. When these loads have a lot in common w.r.t. clocks/vdd-s and/or dependencies, etc., it is a good idea to have a specific implementation for this collection of loads where the transition table of the subtree is pre-calculated and stored during initialization. This avoids recomputation of the subtree's transition table. One such example is a processor subsystem.

Optimization 3: Caching of Intermediate Results

Storing a small number of transition tables in intermediate nodes of the tree hierarchy is a way to significantly reduce the number of transitions that have to be computed. (According to the present invention, results are satisfactory with storing as little as two tables.

More particularly, with each table stored a tag is associated. This tag comprises a bit-string where there is one bit for each load (in the node's subtree): "1" if the load is active and bit "0" if the load is idle.

The present invention provides an advantage because a generic solution can be applied to any System-on-Chip. In addition, specific optimizations for particular SoCs can be added. The invention permits a properly initialized load to transition from active to idle, or from idle to active, thereby resulting in a valid power mode. The present invention can be used, for example, with SoCs having multiple CPU cores that have not yet been implemented. The values for affordable latency and maximum benefit, for example, can be varied depending on the specific application, and a person of ordinary skill in the art should understand and appreciate that the present invention is not limited to the examples shown and described.

In addition, the above-described methods according to the present invention can be realized in hardware or as software or computer code that can be stored as machine readable code in a medium such as a ROM, an RAM, a floppy disk, a hard disk, or a magneto-optical disk or downloaded over a network, so that the methods described herein can be rendered in such software using a general purpose microprocessor, general purpose computer, or a special processor or in programmable or dedicated hardware, such as an ASIC or FPGA.

As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

What is claimed is:

1. A method for providing the optimal power mode for a system on chip (SoC), comprising:

dividing the SOC into hardware blocks comprising power loads having no more than one clock, one Vdd, and one embedded Vdd switch;

storing a respective power state of each of the power loads in a transition table, wherein the transition table comprises a plurality of rows and columns, wherein a row denotes the power state and the columns denote power management resources comprising clocks, Vdds and embedded Vdd switches; and selecting a row from the transition table with a predetermined maximum benefit and affordable latency as an optimal power mode, wherein maximum benefit is defined as a largest amount of a predetermined criterion from among all the plurality of rows, and affordable latency is an amount of computer cycles taking to initiate performance of one or more operations in a selected row.

2. The method according to claim 1, wherein the maximum benefit comprises a largest amount of mWatts saved by selecting a particular row.

3. The method according to claim 1, further comprising: executing a mode transition based on the selected row.

4. The method according to claim 1, wherein for each power load the following information is stored:

a clock id;

a Vdd id;

two benefit values for Standby state, and PowerDown state, respectively;

a Powerdown latency value; and a Wakeup latency value.

5. The method according to claim 4, wherein the information stored for each power load further comprises a Retention state.

6. The method according to claim 4, wherein the transition table is initialized, and the load is in the Active state.

7. The method according to claim 4, wherein the selecting of a row includes requiring that a sum of the powerdown latency and wakeup latency not exceed a predetermined threshold.

8. The method according to claim 1, comprising more than one transition table, and wherein the selecting a row from the transition table with a predetermined maximum benefit comprises joining a first row from one transition table with a second row from another transition table thereby causing property values of the joining of the first and second rows to be a sum of individual properties of the first and second rows.

9. The method according to claim 8, wherein the predetermined threshold of the affordable latency comprises 10% of estimated idle time.

10. A computer program product for use in conjunction with a computer system, the computer program product comprising a tangible computer readable storage medium and a computer program mechanism embedded therein, the computer program mechanism comprising instructions for
dividing a system on chip (SoC) into hardware blocks comprising power loads having no more than one clock, one Vdd, and one embedded Vdd switch;
storing a respective power state of each of the power loads in a transition table, wherein the transition table comprises a plurality of rows and columns, wherein a row denotes the power state and the columns denote power management resources comprising clocks, Vdds and embedded Vdd switches; and
selecting a row from the transition table with maximum benefit and affordable latency as an optimal power mode, wherein maximum benefit is defined as a largest amount of a predetermined criterion from among all the plurality of rows, and wherein affordable latency is defined as an amount of computer cycles required to initiate performance of one or more operations in a selected row.

11. The computer program product according to claim 10, further comprising for each power load, instructions for storing:
a clock id;
a Vdd id;
two benefit values, which respectively indicate how beneficial a transition to the power state/mode represented by the row, for a Standby state and a PowerDown state;
a Powerdown latency comprising a number of compute cycles it takes to perform a state save operation; and
a Wakeup latency comprising a number of compute cycles it takes to perform a state restore operation.

12. The computer program product according to claim 11, wherein the storing further comprises storing a Retention state.

13. The computer program product according to claim 12, wherein the transition table is initialized, and the load is in the Active state.

14. The computer program product according to claim 11, comprising more than one transition table, and wherein the selecting a row from the transition table comprises joining a first row from a first transition table with a second row from another transition table thereby causing property values of the joining of the first and second rows to be a sum of individual properties of the first and second rows.

15. The computer program product according to claim 11, wherein the SoC comprises multiple CPU cores.

16. The computer program product according to claim 11, wherein the power loads are arranged in a tree hierarchy in the transition table.

17. The computer program product according to claim 11, wherein the maximum benefit comprises a largest amount of mWatts saved by selecting a particular row.

* * * * *